(12) United States Patent
Jabro

(10) Patent No.: US 7,913,447 B1
(45) Date of Patent: Mar. 29, 2011

(54) SMART AND MULTIPLE MOUSE TRAP

(76) Inventor: Bahjat S. Jabro, El Cajon, CA (US)

(*) Notice: Subject to any disclaimer, the term of this patent is extended or adjusted under 35 U.S.C. 154(b) by 0 days.

(21) Appl. No.: 12/379,205

(22) Filed: Mar. 23, 2009

(51) Int. Cl.
A01M 23/08 (2006.01)
A01M 23/02 (2006.01)
A01M 23/10 (2006.01)

(52) U.S. Cl. .............. 43/64; 43/71; 43/69; 43/65; 43/66

(58) Field of Classification Search ............... 43/64–67, 43/71–74
See application file for complete search history.

(56) References Cited

U.S. PATENT DOCUMENTS

| 125,290 | A | * | 4/1872 | Harnish et al. ............ 43/74 |
| 230,628 | A | * | 8/1880 | Goodwin ............ 43/74 |
| 666,233 | A | * | 1/1901 | Lindemann ............ 43/69 |
| 710,020 | A | * | 9/1902 | Short ............ 43/71 |
| 864,200 | A | * | 8/1907 | Shelton ............ 43/72 |
| 1,050,220 | A | * | 1/1913 | Link ............ 43/71 |
| 1,090,750 | A | * | 3/1914 | Peach ............ 43/72 |
| 1,101,368 | A | * | 6/1914 | Willard ............ 43/74 |
| 1,168,252 | A | * | 1/1916 | Erdley ............ 43/65 |
| 1,169,950 | A | * | 2/1916 | George ............ 43/74 |
| 1,190,859 | A | * | 7/1916 | Causey ............ 43/65 |
| 1,220,743 | A | * | 3/1917 | Harriman ............ 43/60 |
| 1,244,069 | A | * | 10/1917 | Neuneker ............ 43/74 |
| 1,407,861 | A | * | 2/1922 | Hiett ............ 43/69 |
| 1,497,883 | A | * | 6/1924 | Sosbee ............ 43/66 |
| 1,528,447 | A | * | 3/1925 | Martin ............ 43/67 |
| 1,538,707 | A | * | 5/1925 | Krause ............ 43/69 |
| 1,571,130 | A | * | 1/1926 | Lynn ............ 43/66 |
| 1,616,334 | A | * | 2/1927 | Robichaux ............ 43/71 |
| 1,653,411 | A | * | 12/1927 | Poe ............ 43/72 |
| 1,727,666 | A | * | 9/1929 | Nicks et al. ............ 43/71 |
| 1,739,493 | A | * | 12/1929 | Bewan ............ 43/71 |
| 1,744,412 | A | * | 1/1930 | Patterson ............ 43/66 |
| 1,788,047 | A | * | 1/1931 | Brunner ............ 43/66 |
| 2,056,882 | A | * | 10/1936 | Appiani ............ 43/73 |
| 2,110,678 | A | * | 3/1938 | Robbins ............ 43/72 |
| 2,122,147 | A | * | 6/1938 | Lamp ............ 43/67 |
| 2,126,512 | A | * | 8/1938 | Stemen ............ 43/65 |
| 2,218,746 | A | * | 10/1940 | Arthur ............ 43/72 |
| 2,221,406 | A | * | 11/1940 | Paiuk ............ 43/72 |
| 2,234,983 | A | * | 3/1941 | Russell ............ 43/69 |
| 2,258,904 | A | * | 10/1941 | Murphy ............ 43/72 |

(Continued)

FOREIGN PATENT DOCUMENTS

GB 2117621 A * 10/1983

(Continued)

Primary Examiner — Darren W Ark
(74) Attorney, Agent, or Firm — Altman & Martin; Steven K Martin

(57) ABSTRACT

The Smart and Multiple Mouse Trap uses two ascendant walls that lead to the top of the mouse trap. On the top of the trap, there is a cylinder shaped wheel that will contain food. In order for the mouse to get the food, it must maneuver upward from one of the two ascendant walls. Then it will go through a one way door. Then as it tries to grab the food from the wheel, it will face the problem of the wheel spinning as well as no room to stand on, providing no stability due to gravity. Then the mouse will have to drop into the mouse trap. The removal of the contents inside the trap will be simply to open the right side door and dump it wherever. The mouse trap does not need to be reset when it traps a mouse.

4 Claims, 3 Drawing Sheets

U.S. PATENT DOCUMENTS

| | | | | |
|---|---|---|---|---|
| 2,571,841 A * | 10/1951 | Dague | | 43/67 |
| 2,578,762 A * | 12/1951 | Torgeson | | 43/73 |
| 2,619,765 A * | 12/1952 | Sees | | 43/64 |
| 2,775,844 A * | 1/1957 | Farrell | | 43/69 |
| 2,787,082 A * | 4/1957 | Paschen | | 43/66 |
| 2,835,070 A * | 5/1958 | Gomez | | 43/69 |
| 3,122,856 A * | 3/1964 | Jones | | 43/66 |
| 3,393,468 A * | 7/1968 | Wood et al. | | 43/66 |
| 3,423,870 A * | 1/1969 | Kost | | 43/69 |
| 3,528,191 A * | 9/1970 | Hand | | 43/64 |
| 3,791,065 A * | 2/1974 | Snow | | 43/74 |
| 3,872,619 A * | 3/1975 | McIlwain | | 43/65 |
| 4,154,016 A * | 5/1979 | Reyes | | 43/69 |
| 4,155,193 A * | 5/1979 | MacDonald | | 43/71 |
| 4,157,628 A * | 6/1979 | Saslove | | 43/65 |
| 4,214,399 A * | 7/1980 | Bradley | | 43/66 |
| 4,372,074 A * | 2/1983 | Arrabit | | 43/71 |
| 4,418,493 A * | 12/1983 | Jordan | | 43/67 |
| 4,553,349 A * | 11/1985 | Tsai | | 43/70 |
| 4,603,504 A * | 8/1986 | Llanos | | 43/65 |
| 4,653,221 A * | 3/1987 | Pratscher | | 43/64 |
| 4,706,408 A * | 11/1987 | Mellard | | 43/69 |
| 4,779,373 A * | 10/1988 | Krenson | | 43/66 |
| 4,829,700 A * | 5/1989 | Ha | | 43/61 |
| 4,829,701 A * | 5/1989 | ImBrogno | | 43/61 |
| 4,845,887 A * | 7/1989 | Snyder | | 43/71 |
| 4,876,821 A * | 10/1989 | Benzie | | 43/69 |
| 5,305,545 A * | 4/1994 | Cerullo | | 43/74 |
| 5,386,663 A * | 2/1995 | Fields | | 43/66 |
| 5,410,837 A * | 5/1995 | Kazzyk | | 43/66 |
| 5,517,784 A * | 5/1996 | Sedore | | 43/64 |
| 5,519,962 A * | 5/1996 | Cerullo | | 43/72 |
| 5,528,852 A * | 6/1996 | Sarff | | 43/64 |
| 5,579,601 A * | 12/1996 | Norrad | | 43/65 |
| 5,953,853 A * | 9/1999 | Kim | | 43/73 |
| 5,979,105 A * | 11/1999 | Marks | | 43/61 |
| 5,996,274 A * | 12/1999 | Smith et al. | | 43/64 |
| 6,016,623 A * | 1/2000 | Celestine | | 43/71 |
| 6,088,948 A * | 7/2000 | Rønnau | | 43/64 |
| 6,212,819 B1 * | 4/2001 | Edwards | | 43/71 |
| 6,272,789 B1 * | 8/2001 | Huang | | 43/65 |
| 6,691,452 B1 * | 2/2004 | Knuppel et al. | | 43/64 |
| 6,718,688 B2 * | 4/2004 | Garretson | | 43/73 |
| 6,938,368 B2 * | 9/2005 | Guidry | | 43/69 |
| 7,530,195 B2 * | 5/2009 | Muller et al. | | 43/58 |
| 7,627,981 B1 * | 12/2009 | Doster et al. | | 43/71 |
| 7,854,089 B2 * | 12/2010 | Deibert | | 43/71 |
| 2005/0102887 A1 * | 5/2005 | Lang et al. | | 43/64 |
| 2005/0279015 A1 * | 12/2005 | Hall | | 43/65 |
| 2009/0205245 A1 * | 8/2009 | Orchard | | 43/65 |
| 2009/0229169 A1 * | 9/2009 | Weisberg et al. | | 43/65 |
| 2010/0132244 A1 * | 6/2010 | Ridge | | 43/71 |

FOREIGN PATENT DOCUMENTS

| | | | |
|---|---|---|---|
| JP | 09121748 A * | 5/1997 | |
| JP | 11308960 A * | 11/1999 | |
| JP | 2001157544 A * | 6/2001 | |
| JP | 2001333682 A * | 12/2001 | |
| WO | WO 9848620 A1 * | 11/1998 | |
| WO | WO 2006010279 A1 * | 2/2006 | |

\* cited by examiner

SMART AND MULTIPLE MOUSE TRAP

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

Field of the Invention

The present invention relates to mouse traps.

BRIEF SUMMARY OF THE INVENTION

The present invention is a mouse trap that holds more than one mouse. The trap has a rectangular bottom. Two ascendant walls to a platform where there are one-way doors. A short step extends from the inside of each of the doors. A freely-rotating wheel containing bait is mounted to the apex of the ascendant walls between the steps. As the mouse reaches for the bait, the wheel spins causing the mouse to lose balance and fall into the bottom. The mouse is removed by opening a door in the side of the bottom and removing a tray.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 4:
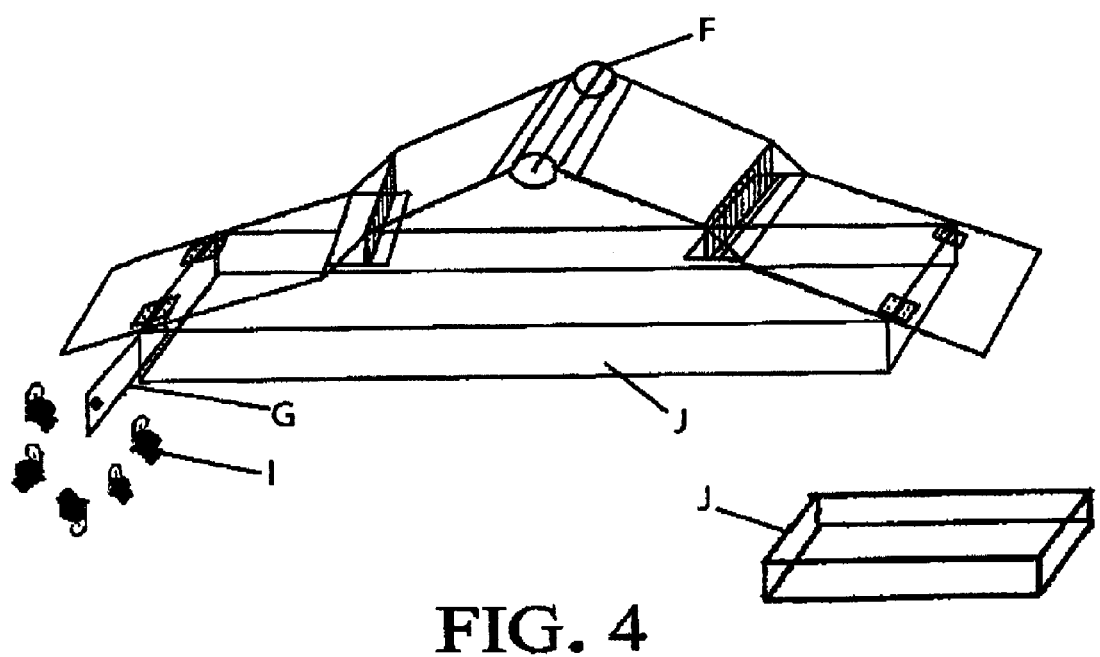
FIG. 4 is a side perspective view of the mouse trap of FIG. 1 showing trapped mice being released.

The Smart and Multiple Mouse Trap is made using acrylic glass. It is about 12-15 inches tall, 10 inches wide and 24 inches long. However, the size of the trap may vary depending upon demand. The trap is rectangular shaped at the bottom and the top is a half octagon shaped, similar to that of a house roof. To the right and left side of the half octagon shaped roof, there are two ascendant walls A that lead to a platform B the top of the mouse trap. There are entering one way doors C in which the mouse will enter through in order to get to the cylinder wheel F with the food. The two ascendant walls A will have hinges E that will allow the wall A to flip into a compact area when not used for safety standards. In the bottom rectangular portion of the trap there are two sides. The left side K will remain shut, while the right side G will be opened to remove the contents of whatever is trapped, as in FIG. 4.

Figure 1:
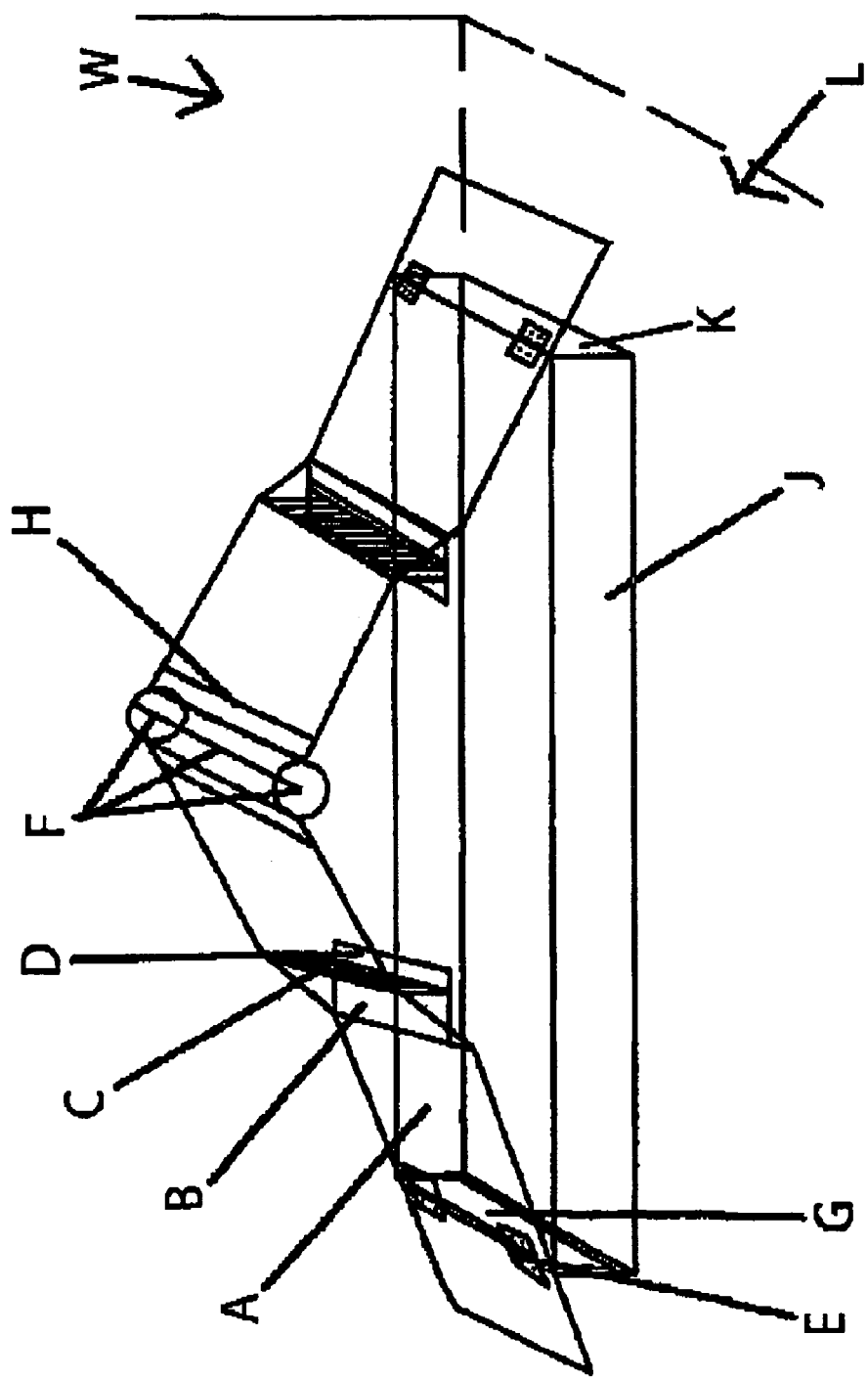
FIG. 1 is a side perspective view of the mouse trap of the present invention.
Figure 2:
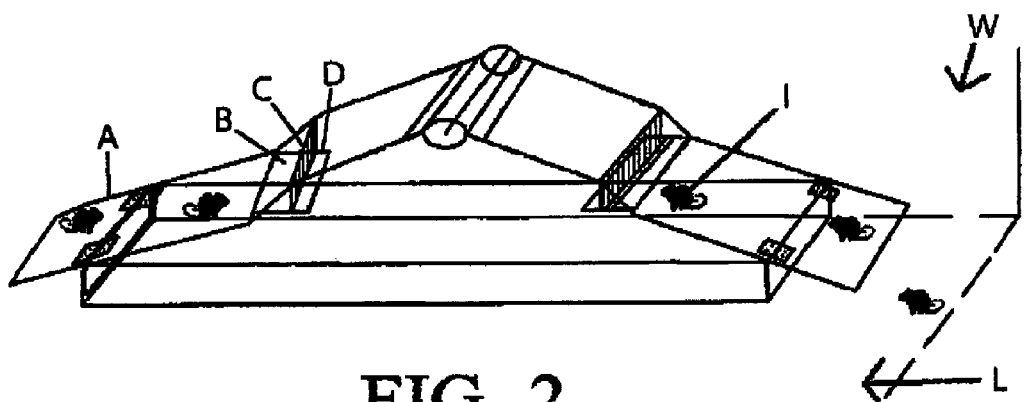
FIG. 2 is a side perspective view of the mouse trap of FIG. 1 showing mice going up the ascendant walls.
Figure 3:
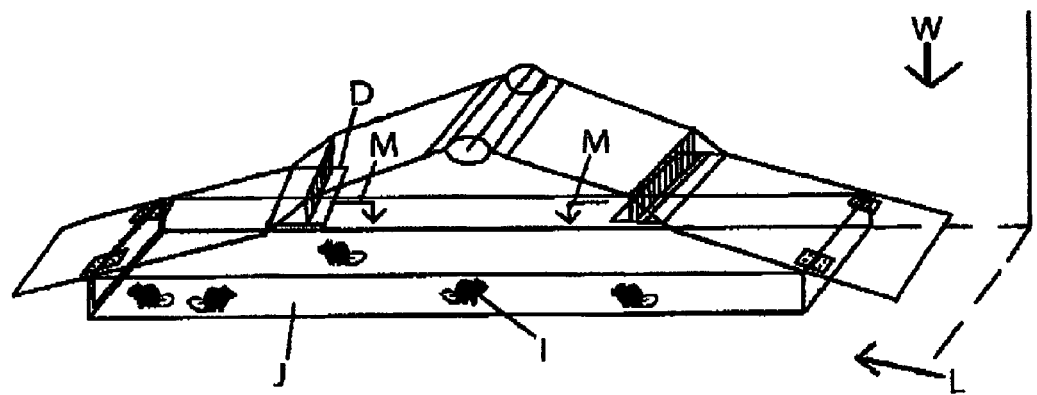
FIG. 3 is a side perspective view of the mouse trap of FIG. 1 showing mice falling into the trap.

The Smart and Multiple Mouse Trap uses two ascendant walls A that lead to a platform B at the top of the mouse trap. On top of the trap there is a cylinder-shaped wheel F that will contain some type of food attached to it on the inside. In order for the mouse I to get the food, it will maneuver upward to the food that is placed in a spinning wheel F, as in FIG. 2. Before reaching the cylinder wheel F, the mouse I will face a one-way door C. It will go through the door C and will not be able to get out. The mouse I will stand on a step D. On top there is a wheel F with the food. Then as it tries to grab the food from the wheel F, it will face the problem of the wheel F spinning as well as no room to stand on, providing no stability to eat the food. Then the mouse I will have to drop into the mouse trap J, as at M in FIG. 3. There, it will be trapped along with many more mice I depending on its size. The removal of the contents inside the trap J will be simply to open the right side door G, remove the tray and dump it into the desirable location, as in FIG. 4.

REFERENCE LETTERS

A. The left side ascendant wall. It will lead from the floor to the top door on the octagon shaped roof and also to the cylinder with food. It will have hinges that will allow it to fold for space and safety.

A1. The half portion of the ascendant wall that folds when not used.

B. The area on top of the octagon roof in which the mouse will stand before entering into the one way door.

C. The one way door that will lead inside of the trap.

D. The step after entering from the door. It will be slightly higher than the bottom of the trap.

E. The hinges attached to the walls that fold to close or open.

F. The rotating cylinder that will be filled with food. Which will attract the mice into the trap.

G. The left sliding door that is located at the bottom side of the rectangular shape. It will be used to empty the contents of the trap.

H. An opening that is a door which is attached to the cylinder wheel for adding food inside as well as to clean it.

I. The mice entering the trap using the two ascendant walls into a one way door.

J. The base area of the trap that holds the trapped mice within a tray. It is a large area where many mice will fit in.

W. Wall

L. Ground level

The invention claimed is:

1. A mouse trap adapted to sit on a horizontal surface, said trap comprising:
   (a) a bottom having a floor adapted to sit on said horizontal surface, two first opposed walls with upper edges, two second opposed walls, and an open top;
   (b) a pair of ascendant walls sloping downwardly and away from said upper edges of said first opposed walls toward said horizontal surface and upwardly from said upper edges of said first opposed walls to an apex above said open top;
   (c) a cylindrical wheel mounted at said apex to freely rotate about a horizontal axis and adapted to hold bait;
   (d) a break in said ascendant walls between said upper edges of said first opposed walls and said wheel, said break having a horizontal platform;

(e) a vertical, one-way door on each of said platforms; and (f) a step inside each of said doors, an edge of said step being open to said open top of said bottom;

(g) whereby a mouse walks up one of said ascendant walls to said platform, through said door, and onto said step, then reaches up to said wheel causing said wheel to rotate, thereby causing said mouse to lose balance and fall into said bottom.

2. The mouse trap of claim 1 wherein said bottom includes a removable drawer and a side door through which said drawer can be removed for disposal of said mouse.

3. The mouse trap of claim 1 wherein said ascendant walls are comprised of a clear acrylic.

4. The mouse trap of claim 1 wherein said ascendant walls are hinged at said upper edges of said first opposed walls.

* * * * *